(12) United States Patent
Dombroski

(10) Patent No.: US 7,185,955 B2
(45) Date of Patent: Mar. 6, 2007

(54) VISUAL INDICATOR FOR PRESSURIZED HUB

(76) Inventor: Henry Dombroski, 9490 Cross Creek Dr., Boynton Beach, FL (US) 33436

( * ) Notice: Subject to any disclaimer, the term of this patent is extended or adjusted under 35 U.S.C. 154(b) by 129 days.

(21) Appl. No.: 10/969,782

(22) Filed: Oct. 19, 2004

(65) Prior Publication Data

US 2006/0082214 A1 Apr. 20, 2006

(51) Int. Cl.
*B60B 27/00* (2006.01)
(52) U.S. Cl. .................... 301/108.1; 116/270
(58) Field of Classification Search ............ 301/108.1, 301/108.2, 108.3, 108.4; 116/216, 218, 220, 116/270
See application file for complete search history.

(56) References Cited

U.S. PATENT DOCUMENTS

| | | | | |
|---|---|---|---|---|
| 3,003,834 A | | 10/1961 | Pendleton | |
| 3,149,883 A | * | 9/1964 | Reilly | 301/108.3 |
| 3,642,327 A | * | 2/1972 | Walther | 301/108.1 |
| 3,736,899 A | * | 6/1973 | Manske | 116/270 |
| 3,780,693 A | * | 12/1973 | Parr | 116/270 |
| 3,785,706 A | | 1/1974 | Vangalis | |
| 3,893,690 A | * | 7/1975 | Yapp | 301/108.3 |
| 3,949,610 A | * | 4/1976 | Pietsch | 73/715 |
| 4,190,133 A | | 2/1980 | Ploeger | |
| 5,054,859 A | | 10/1991 | Goettker | |
| 5,104,202 A | * | 4/1992 | Branch | 301/108.1 |
| 5,303,800 A | * | 4/1994 | Persson | 184/5.1 |
| 5,551,530 A | * | 9/1996 | Goettker | 184/45.2 |
| 5,752,746 A | * | 5/1998 | Perry | 301/108.1 |
| 5,860,708 A | * | 1/1999 | Borders et al. | 301/108.1 |
| 6,546,892 B2 | * | 4/2003 | Kelly et al. | 116/216 |
| 6,983,999 B2 | * | 1/2006 | Goettker | 301/108.4 |

\* cited by examiner

*Primary Examiner*—Russell D. Stormer
(74) *Attorney, Agent, or Firm*—McHale & Slavin PA

(57) ABSTRACT

A tactile and visual indicator is mounted on the hub cap of an axle of a vehicle. The indicator has a deformable face that protrudes away from the hub cap in response to the presence of pressurized air in the space containing the wheel bearings. The position of the deformable face indicates the presence or absence of hub integrity and indication of grease about the wheel bearings.

14 Claims, 3 Drawing Sheets

VISUAL INDICATOR FOR PRESSURIZED HUB

FIELD OF THE INVENTION

This invention is related to the field of wheel hubs and, in particular, to a visual indicator that operates on the pressurization of a wheel hub to indicate hub seal integrity.

BACKGROUND OF THE INVENTION

Wheel hubs for use in coupling a tire to an axle are well known. By way of illustration, a conventional trailer for general cargo, boat, snowmobile, personal watercraft, etc. utilizes a fixed axle secured to a trailer frame. A wheel assembly is coupled to the axle by use of a wheel hub. The wheel hub employs a bearing assembly to allow free rotation of the hub in relation to the axle. Thus, the wheel assembly, which includes the tire, permits transportation of the trailer over a road when pulled by a powered vehicle, such as an automobile. The conventional wheel hub employs bearings, namely an inner and outer bearings with an associated inner and outer race, which permits rotational movement in relation to the axle.

As with any friction producing components, it is imperative that the bearings are lubricated in order to prevent premature wear. Typically, grease is used which liquefies during bearing rotation for use in lubricating the bearings. The lubricating grease is sealed within the hub by use of an oil seal positioned along an inner side surface of the hub, and a bearing cap that acts as a seal and is positioned along an outer side surface of the hub. The seals are used to prevent liquified grease from escaping the hub joint.

The integrity of the oil seal and hub cover is critical to prevent loss of grease. Absence of a lubricant can quickly lead to catastrophic failure of the bearings causing hub disengagement with the axle, which can result in wheel assembly loss and the associated dangerous scenario of property and possibly life endangerment. For instance, a trailer carrying a heavy load such as a 25 foot boat, will quickly heat up a bearing that is not properly lubricated. Should the bearing fail, the bearing and race will typically disintegrate with a likely result of the hub and wheel detaching from the axle of the trailer. Boat trailers present an excellent example of premature wear as a boat trailer is typically submerged in water for loading or unloading of the boat. Should there be a failure of the hub seal, water is allowed to enter the hub resulting in the premature wear. In addition, should the water be saltwater, bearing disintegration is greatly enhanced since rust forming on the bearing surfaces will operate to destroy the bearings within very short use.

In light of the above, numerous attempts have been made in order to prevent loss of bearing lubricant Many prior art wheel hub devices maintain pressurized grease within the hub. A very successful system consists of a modified hub cap having a grease fitting with a spring forming a pressurized seal. Grease weeping from the hub under pressure visually indicates that grease has been inserted into the hub. However, should the hub seal fail, the assembly will actually facilitate grease being pushed through the seal. Should the spring jam, even if the bearing indicator illustrate that grease is prevalent in the seal, it may be providing a false indication. In addition, a slow leak will allow grease to be inserted into the hub and upon liquification during operation the seal could allow the liquified grease to easily escape.

Unfortunately, a spring loaded system to pressurize grease into the hub results in an excess amount of grease injected into the hub for proper operation. This results in an obvious waste of grease for only the bearing rollers must be lubricated. Thus, the amount of grease necessary is simply a coating over the bearing rollers. The spring loaded system advocates that should a seal leak, the user need simply pump more grease into the wheel hub on a continuous basis. Of course, the grease continues to leak from the wheel hub because the breach in the seal remains. For instance, a person may check a hub and insert grease into the hub before taking the trailer on the road. Once the trailer reaches operating speed, the liquified grease may easily escape. Should the operator back trailer into a lake, for purposes of unloading a boat, grease that has escaped from the hub and remains on the trailer will be exposed to the water.

Prior art patents directed to wheel bearing lubricators teach that the release of grease into the water is advantageous. Vangalis, U.S. Pat. No. 3,785,706, discloses a hub cap of transparent plastic which is closed at the outer end and contains a spring-backed piston for applying pressure on lubricant grease in the hub cap for yielding when the lubricant expands. The hub cap has two small vents, one for permitting lubricant to escape when expansion is excessive and the other to vent the enclosed portion of the hub behind the piston to atmospheric pressure.

Ploeger, U.S. Pat. No. 4,190,133, discloses a wheel bearing pressure lubricator for hubs subject to periodic submersion in water. The device includes a piston for relieving excess lubricant pressure and a piston position indicator providing a visual indication when the piston is in hub filled position and when the piston is in a no pressure position at which the piston ceases to apply pressure to the lubricant in the hub.

U.S. Pat. No. 5,054,859 to Goettker also teaches the use of a colored visual indicator to show the presence or absence of pressurized grease in a wheel hub.

The adverse environmental impact of petroleum product contamination of natural water environments is well known. The constant expulsion of grease into natural waters by the prior art bearing lubrication systems will have a cumulative negative impact on the environment. In the year 2001, the National Marine Manufacturers Association estimated that 7,564,900 boat trailers were in operation, a significant number of which are continuously expelling grease into natural waters. Should the water be a reservoir for drinking water, even a few drops of oil can result in system contamination. However, it is well known that any oil in water has an adverse effect to wildlife.

Total estimated retail expenditures on boating totaled $25,593,409,000 in 2001. Recreational boating in the United States is an ever-growing industry, a trend which is increasingly at odds with environmental concerns. The continued water pollution by leaking wheel hubs is unnecessary and preventable, and that there remains a need for an "environmentally friendly" system of bearing maintenance.

Thus, what is lacking in the art is a low cost positive indication of hub and oil seal integrity to indicate availability of bearing grease within the hub which does not release grease into the environment.

SUMMARY OF THE INVENTION

An objective of this invention to provide a low cost wheel hub assembly capable of providing an air-tight seal. The assembly includes a visual indicator of air pressure within the hub for use in monitoring oil seal integrity. A deformable gauge mounted to a hub cap is joined with a air insertion valve allowing air insertion by use of conventional inflation pump.

It is another objective of the instant invention to provide a visual indicator of oil seal integrity of hub assemblies.

Still another objective of the instant invention is to provide a visual indicator that operates before grease liquidisation, during grease liquidisation, and after grease liquidisation of the grease providing a positive indication that wheel bearing grease has not escaped the hub.

Still another objective of the instant invention is to provide an indicator for law enforcement that hub integrity is intact before allowing trailer placement within a body of water thereby preventing a leaking hub from contamination of water with oil byproducts.

Yet still another objective of the instant invention is to provide a positive pressure within the hub at all times to prevent the entrance of particles within the hub including water, to prevent premature destruction of the wheel bearing assemblies.

It is a further objective of the instant invention to provide a hub cap designed to protect wheel bearing assemblies which does not harm natural water environments by facilitating grease expulsion, thereby representing an improvement over the prior art devices.

In accordance with the above objectives, a pressurized wheel hub is provided which comprises a wheel hub having bearings that are rotatably securable to an axle; seals between the wheel hub and the axle, the seals forming a closed air space around the bearings; and a self sealing deformable valve for insertion of pressurized air into the closed air space.

The hub cap comprises a cylindrical housing having an outer end and an open inner end, the open inner end being adapted for attachment in an air-tight sealing arrangement to the outer end of a wheel hub to form a closed air system with the interior of the wheel hub. An air valve, located in the outer end provides an air flow connection with the closed air system for receiving pressurized air. The outer end includes an air pressure deformable portion of the valve in an air flow connection with the closed air system operable to provide a visual indication of the air pressure in the closed air system whereby a breached seal condition within the wheel hub can be detected. The open inner end is formed with a flange and an annular shoulder wherein the flange is adapted to fit into the outer end of a wheel hub with an airtight seal. The hub cap can be adapted for threaded engagement with the wheel hub or can be press fit. The annular shoulder includes a circumferential recess and an O-ring is disposed in the recess to provide an effective air tight seal.

The deformable valve portion includes a valve face and a pressure indicating surface moving relative to the outer end of the hub cap in direct relation to the air pressure within the closed air system. The valve face includes tactile indicia to assist an observer to readily identify a breached seal condition within the wheel hub in poor light conditions.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
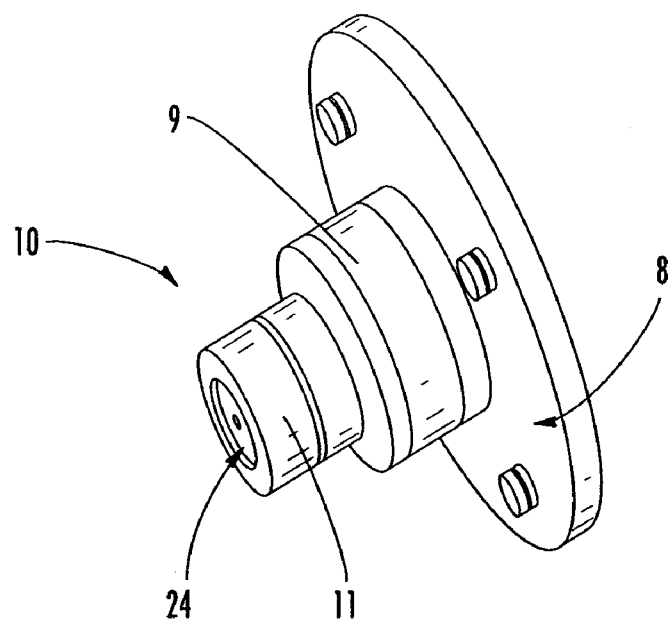
FIG. 1 is a perspective view of a hub cap according to a preferred embodiment of the invention as installed on a trailer wheel hub.
Figure 2:
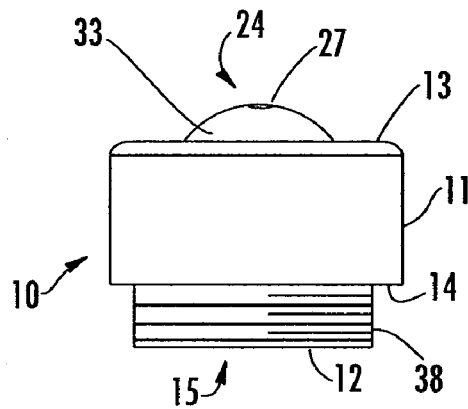
FIG. 2 is a side view of the hub cap of FIG. 1 with deformed valve.
Figure 3:
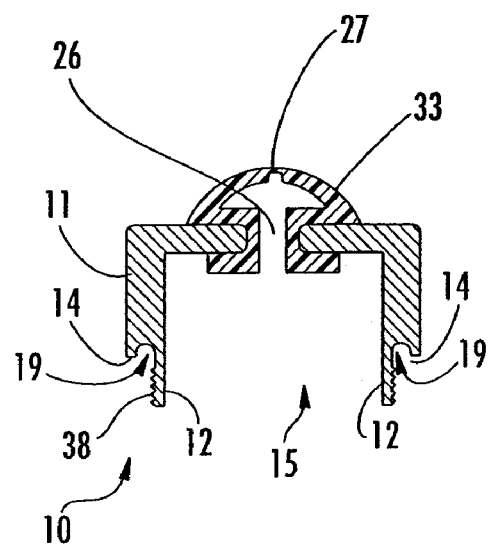
FIG. 3 is a cross-sectional view of the hub cap of FIG. 2.
Figure 4:
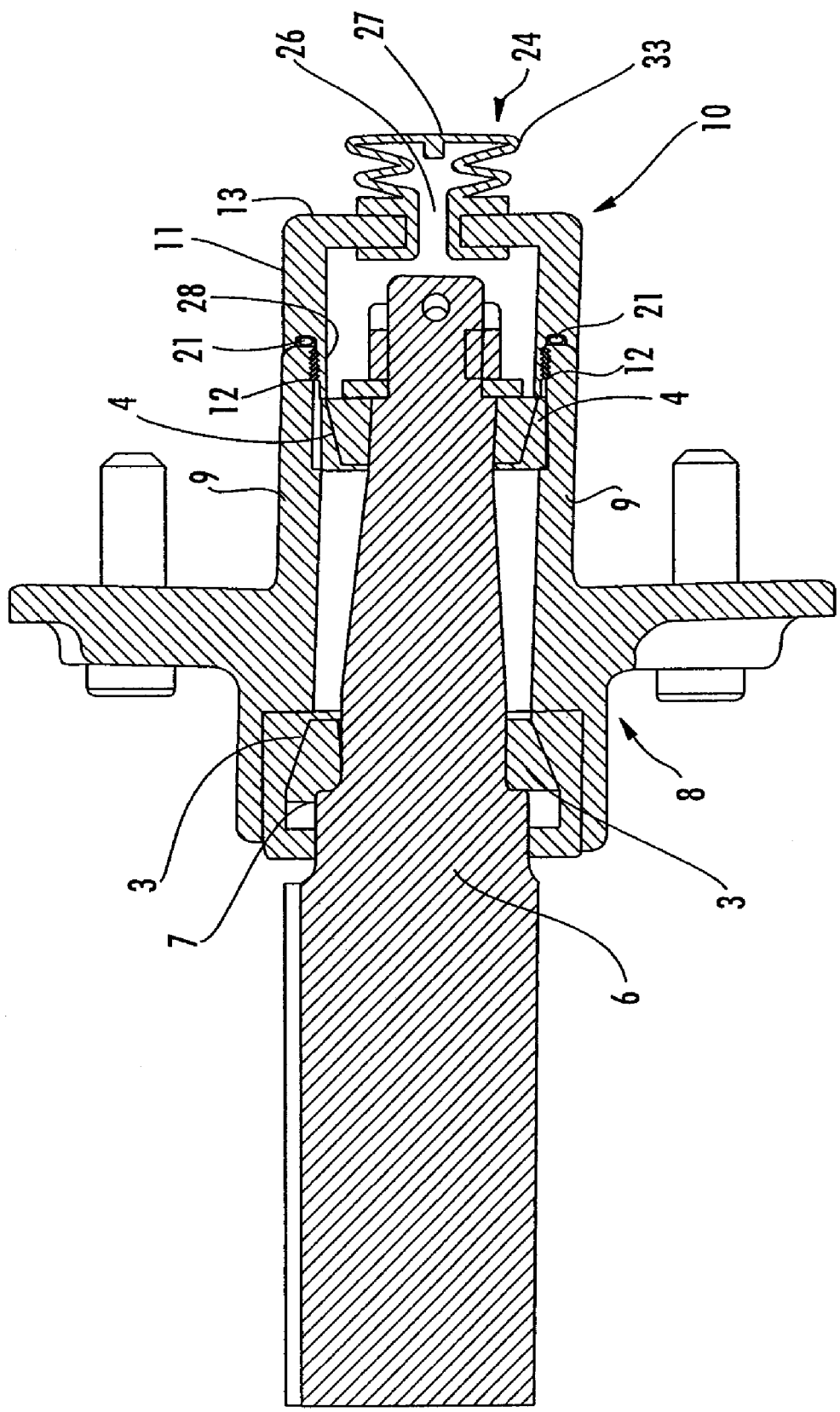
FIG. 4 is a cross-sectional view of the hub cap of FIG. 1 installed on a wheel hub and axle assembly.

A hub cap 10 according to a preferred embodiment of the invention is shown in FIGS. 1–3. FIG. 1 illustrates the hub cap 10 as installed to the wheel hub 9 of a boat trailer wheel. FIG. 4 is a cross-sectional view of the hub cap 10 as assembled with a hub 9 of an axle and wheel unit 8 for a trailer. The hub 9 is rotatably supported on bearing assemblies 3 and 4 and mounted on an axle 6. A seal 7 adjacent the inner bearing 3 seals the end of the chamber within the hub 9.

As best seen in FIGS. 2 and 3, the hub cap 10 of the invention includes a cylindrical housing 11, commonly referred to as a dust cap, having a closed first end 13 and an open second end 15. The second end 15 is formed with a flange 12 and an outer annular shoulder 14 which enable the hub cap 10 to be inserted into the outer end of the wheel hub 9 so as to constitute an extension of the wheel hub 9. The flange 12 fits tightly enough within the hub cap 10 so as to create an approximately air tight seal. In the preferred embodiment, the outer end of the wheel hub 9 is sized to allow press fit of the cylindrical housing 11 wherein flange 12 can be sealed with a bonding agent such as LOCKTITE to prevent leakage of air or grease.

In an alternative embodiment, the wheel hub may include threads 28 formed on the inside surface, and the outer surface of flange 12 may have matching threads 38. The annular shoulder 14 may again be sealed with a bonding agent to provide an air tight seal or include a circumferential recess 19 therein which receives a rubber O-ring 21 (FIG. 4) so that a fully air tight seal can be achieved, thus creating a closed air system within the wheel hub 9.

In the preferred embodiment, the wheel hub 9 includes a valve 24 for insertion of pressurized air into the closed air system within the wheel hub. As can be seen in FIGS. 3 and 4, an air valve 24 for receiving pressurized air extends from the cylindrical housing 11. The air valve 24 has a through bore 26 in an air flow connection with the closed air system within the hub cap 10. The through bore 26 is closed by a self sealing inlet 27. The self sealing inlet is a resilient plug, with or without a pre-formed passageway therethrough, through which a hollow needle is inserted. The needle is connected to a source of pressurized air for pressurizing the wheel hub. When the needle is removed from the inlet 27, the passageway automatically closes forming a seal. By way of example, the resilient plug is similar to those found on a conventional basketball wherein a needle tube coupled to a hand pump is inserted into the plug for presenting pressurized air into the hub.

The air valve 24, shown in cross section in FIG. 3 is flexible and deformable in response to pressurized air within the wheel hub. As the air pressure increases within the wheel hub, the valve face 33 deforms outwardly. If the air valve 24 is expanded, the integrity of the air trapped within the hub is visually confirmed. If the air valve 24 is flat showing no positive signs of expansion, an observer could immediately detect that a breached condition has occurred and warrants investigation.

Figure 5:
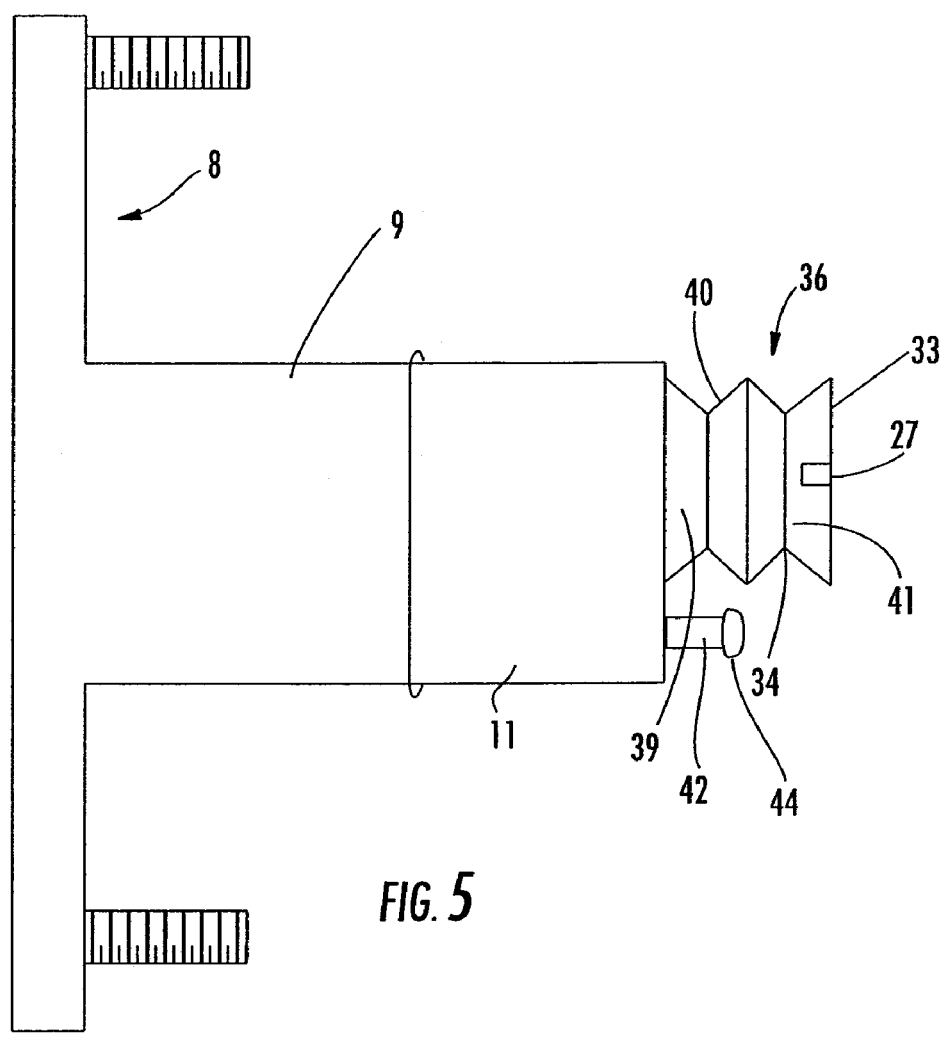
FIG. 5 is a side view of the hub cap of FIG. 4 with the valve deformed.
Figure 6:
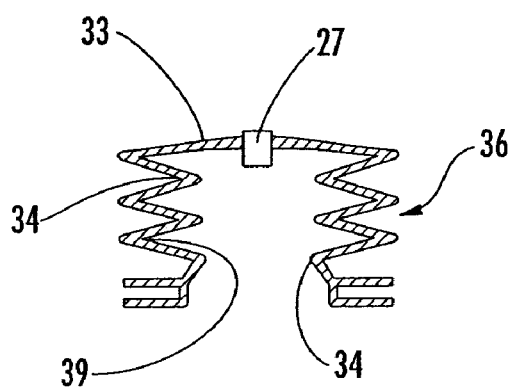
FIG. 6 is a cross section of the valve of FIG. 4 and FIG. 5.

As shown in FIGS. 4–6, the air valve 24 may also be formed as a bellows 36. The bellows may be tubular with circumferential rings 34 spaced along the length of the structure defining interconnected air chambers 39, 40 and 41, FIG. 5. The rings 34 restrict the expansion of the bellows and provide shape to the expanded bellows. The bellows 36 may be designed to expand in a certain sequence relative to the air pressure present in the wheel hub. For example, 5 psi (pounds per square inch) air pressure would inflate one chamber 41 and 10 psi would expand another chamber 40. In this manner, the air valve would operate as a visual or tactile gauge to indicate a trend and show any remaining air pressure.

As shown in FIG. 5, the closed end of the hub cap housing 11 can optionally include a through bore for receiving the conduit or clindrical metal tube 42, which is fixedly secured therein to provide an air flow coupling between a source of pressurized air and the wheel hub 9. In this alternative embodiment, the conduit 42 is fitted with a conventional inflation valve 43 of any operable construction as would commonly be utilized to inflate automobile tires and the like. As is the conventional construction, a spring-loaded axially disposed post is contained in the valve 43 which is depressed by attachment of an inflation device. The inflation valve 43 is receptive to air from an air compressor, a hand pump, or even an extension hose from a tire valve for use in air insertion. When such a valve is employed, the bellows continues to operate as a visual indicator of the hub integrity. The preferred embodiment of the bellows requires a positive air pressure for expansion to indicate a pressurized condition.

FIG. 4 illustrates a conventional mode of assembly of a wheel hub, the axle 6 is concentrically coupled to bearing assembly 3, the wheel hub 9, and bearing assembly 4, and secured by washer and nut assembly. The hub cap 10 of the invention is attached to the wheel hub 9 in the manner previously described. In order to provide an improved air tight seal at the point of connection of the bearing assembly 3 and the axle 6, the system of the invention can further include the inclusion of a polished sleeve between the bearing assembly 3 and the axle 6 where the seal rides. For instance, should an existing axle be reworked to accommodate the instant invention, the use of a sleeve can be sealingly secured to the axle to provide a smooth surface for the oil seal. The greatest wear problem for the oil seal is the poor surface preparation of the axle that results in premature failure of the oil seal. The use of a sleeve on used axles provides extended oil seal life. In addition, poor manufacturing of an axle can also be rectified by the sleeve.

In use, the installed hub cap 10 initially receives air from a pressurized air source such as a basketball air pump through the air valve 24 until the air pressure is approximately 1–10 psi. If an air pressure of 1–10 psi cannot be achieved, this would be indicative of a broken seal within the wheel hub 9.

The air valve can be removed allowing inspection of the outer bearing of the hub without removal of the dust cap. Further, modern axles include a grease fitting to allow grease to be pumped into the inner bearing. Removal of the air valve allows access to such a fitting, again without removal of the dust cap. Once the inner and outer bearing has been inspected and or greased, the air valve can be reinserted into the dust cap. If the air valve is worn or damaged, only the air valve need be replaced without disrupting the air cap or wheel assembly.

The present invention advantageously allows the user (or a law enforcement official) to quickly visually inspect each trailer wheel to determine the integrity of the seals within the wheel hub. If the pressure is maintained within a wheel hub, the seals are expanded, and the trailer wheels can be safely submerged without danger of water damage. When a loss in air pressure is observed, it is an indication that repairs to restore the integrity of the seals must be completed before the trailer can be used in water. While the prior art devices also provide a visual indication of broken seals, they do not require repairs in order to continue use of the trailer, but instead allow the user to temporality remedy the situation by pumping grease into the wheel hub to stop water penetration by maintaining the grease under pressure. Since the leak has not been actually been repaired, the pressurized grease continues to be ejected into the water when the prior art devices are used. In contrast, the system of the present invention requires the repair of hub leaks, and does not continuously pollute the waters in which the trailer is deployed.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings. The instant invention can be used on automobile and truck axles including CV joints, or on any other coupling where integrity of the bearing housing is critical. It should be noted that proper seals prevents road grit or other contaminants from entering the bearing housing thereby enhancing bearing life.

What is claimed is:

1. A hub cap for insertion of pressurized air into a conventional wheel hub, said hub cap comprising: a housing having an outer end and an inner end, said inner end adapted for attachment to an outer end of said conventional wheel hub providing an air-tight sealing arrangement, and a means for pressurizing said hub cap, including a pressure deformable valve in said outer end of said hub cap to provide a visual indication of the pressurized air whereby a loss of pressure within the wheel hub can be detected wherein said air pressure deformable valve includes a bellows expanding in direct relation to the air pressure within said hub cap.

2. The hub cap of claim 1 wherein said pressure deformable valve includes a self sealing through bore.

3. The hub cap of claim 1 wherein said inner end of said hub cap is formed with a flange and an outer annular shoulder and said flange is adapted to fit within the outer end of a wheel hub.

4. The hub cap of claim 3, wherein said flange includes threads adapted for engagement with mated threads on the inside surface of a wheel hub.

5. The hub cap of claim 3, wherein said flange is adapted to be press fit into the outer end of a wheel hub.

6. The hub cap of claim 1, wherein said outer end of said hub cap includes an aperture, a valve sealed in said aperture, said valve having a resilient body with a through bore forming a passageway for said pressurized air, the portion of said valve between said aperture and said through bore forming a deformable valve face, said valve face adapted to close said through bore and extend outwardly from said outer end under influence of said pressurized air.

7. The hub cap of claim 6, wherein said inner end is formed with a flange and an outer annular shoulder, said flange is adapted to fit within the outer end of a wheel hub wherein said outer annular shoulder includes a circumferential recess and an O-ring is disposed in said recess.

8. The hub cap of claim 1, wherein said outer end includes an aperture, a cylindrical metal tube seated in said aperture, said means for pressurizing said hub cap is disposed in said cylindrical metal tube.

9. In the combination of a conventional wheel hub and a hub cap for sealing said hub, the improvement comprising a flexible housing having a closed outer end and an open inner end, said open inner end attached to an outer end of said conventional wheel hub cap providing an air-tight sealing arrangement, said housing having expandable sidewalls in the shape of a bellows with at least one large diameter chamber defined by rings of a smaller diameter, said bellows expandable by pressurized air to provide a visual indication of the presence of pressurized air, said closed end of said bellows having a one-way valve to maintain pressurized air in said bellows whereby a loss of pressure within the wheel hub can be detected.

10. In the combination of claim 9, said large diameter chamber expanding under approximately 5 psi internal pressure.

11. In the combination of claim 10, said bellows including at least a second large diameter chamber, said second large diameter chamber expanding under approximately 10 psi internal pressure.

12. In the combination of claim 9, said one-way valve being imperforate, said one-way valve self-sealing upon withdrawal of a pressurizing device.

13. In the combination of claim 9, said bellows being removably attached to said hub cap, said bellows being removable for service.

14. In the combination of claim 9, said expandable bellows having plural connected air chambers constructed and arranged for sequential expansion responsive to particularly defined levels of increasing air pressure, whereby said bellows functions as a visual or tactile pressure gauge.

* * * * *